United States Patent
McDiarmid et al.

(10) Patent No.: US 9,516,094 B2
(45) Date of Patent: Dec. 6, 2016

(54) EVENT-RESPONSIVE DOWNLOAD OF PORTIONS OF STREAMED APPLICATIONS

(75) Inventors: Trevor McDiarmid, Seattle, WA (US); Gurashish Brar, Snoqualmie, WA (US); Joe Yap, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1189 days.

(21) Appl. No.: 13/474,149

(22) Filed: May 17, 2012

(65) Prior Publication Data

US 2013/0311600 A1    Nov. 21, 2013

(51) Int. Cl.
*H04L 29/08* (2006.01)
*G06F 9/445* (2006.01)
*G06F 9/54* (2006.01)

(52) U.S. Cl.
CPC ........... *H04L 67/10* (2013.01); *G06F 9/44521* (2013.01); *G06F 9/44557* (2013.01); *G06F 9/542* (2013.01)

(58) Field of Classification Search
CPC G06F 8/61; G06F 17/30772; G06F 17/30017; G06F 9/4416; H04L 67/06; H04L 51/2023; H04L 67/10
See application file for complete search history.

(56) References Cited

U.S. PATENT DOCUMENTS

| | | | |
|---|---|---|---|
| 5,765,205 A * | 6/1998 | Breslau et al. | 711/203 |
| 6,243,789 B1 * | 6/2001 | Hasbun et al. | 711/103 |
| 6,574,618 B2 | 6/2003 | Eylon et al. | |
| 6,918,113 B2 | 7/2005 | Patel et al. | |
| 7,043,524 B2 * | 5/2006 | Shah | H04L 63/0281 707/999.009 |
| 7,062,567 B2 | 6/2006 | Benitez et al. | |
| 7,577,751 B2 | 8/2009 | Vinson et al. | |
| 7,877,552 B2 * | 1/2011 | Leveille | G06F 9/52 711/147 |
| 7,979,856 B2 | 7/2011 | Murray et al. | |

(Continued)

FOREIGN PATENT DOCUMENTS

EP       1318451 A1     6/2003

OTHER PUBLICATIONS

Cui, et al., "A Virtual File System for Streaming Loading of Virtual Software on Windows NT", In 7th International Conference, Advances in Grid and Pervasive Computing, May 11, 2012, 14 Pages.

(Continued)

*Primary Examiner* — Jimmy H Tran
(74) *Attorney, Agent, or Firm* — Thomas S. Wong; Fehmi Chebil; Micky Minhas (57) ABSTRACT

Disclosed here are implementations involving an application program that includes an event handling portion. The event handling portion monitors for an event associated with execution of an initial portion of the application program downloaded with the event handling portion that involves an additional portion of the application program not yet downloaded. In response to detecting the event, the execution of the initial portion of the application program is paused by the event handler and downloading of the additional portion is initiated. Upon downloading the additional portion of the application program, execution of the initial portion of the application program can resume.

19 Claims, 4 Drawing Sheets

(56) References Cited

U.S. PATENT DOCUMENTS

| | | | | |
|---|---|---|---|---|
| 8,438,298 | B2* | 5/2013 | Arai | G06F 8/65 709/203 |
| 8,676,938 | B2* | 3/2014 | Hitomi | H04L 65/105 709/203 |
| 9,395,970 | B2* | 7/2016 | Lerner | G06F 8/61 |
| 2001/0034736 | A1* | 10/2001 | Eylon | G06F 17/30067 |
| 2003/0009538 | A1* | 1/2003 | Shah | H04L 63/0281 709/219 |
| 2003/0112271 | A1* | 6/2003 | Batalden et al. | 345/744 |
| 2004/0044997 | A1* | 3/2004 | Talati et al. | 717/170 |
| 2005/0278708 | A1* | 12/2005 | Zhao et al. | 717/136 |
| 2006/0092861 | A1* | 5/2006 | Corday et al. | 370/256 |
| 2007/0214340 | A1* | 9/2007 | Leveille | G06F 9/52 711/203 |
| 2008/0133891 | A1* | 6/2008 | Salz | G06F 8/30 712/220 |
| 2008/0134158 | A1* | 6/2008 | Salz | G06F 8/41 717/148 |
| 2008/0178298 | A1* | 7/2008 | Arai | G06F 8/65 726/29 |
| 2008/0281884 | A1* | 11/2008 | Subrahmanyam | 707/205 |
| 2009/0193298 | A1* | 7/2009 | Mukherjee | 714/38 |
| 2010/0257345 | A1* | 10/2010 | Tazzari et al. | 713/1 |
| 2010/0318988 | A1* | 12/2010 | Barr | G06F 8/60 717/178 |
| 2011/0154065 | A1* | 6/2011 | Rothman et al. | 713/300 |
| 2011/0185043 | A1* | 7/2011 | Zeller et al. | 709/219 |

OTHER PUBLICATIONS

Hunt, et al., "Detours: Binary Interception of Win32 Functions", In Proceedings of the 3rd Conference on USENIX Windows NT Symposium, vol. 3, Jul. 1999, 9 Pages.

"App-V 4.6 Application Publishing and Client Interaction", Published on: Dec. 31, 2010, Available at: http://download.microsoft.com/download/F/7/8/F784A197-73BE-48FF-83DA-4102C05A6D44/App-V/AppPubandClientInteraction_final.docx.

"Virtual Application Management with Microsoft Application Virtualization 4.5/4.6 and System Center Configuration Manager 2007 R2", Retrieved on: Aug. 16, 2013, Available at: http://download.microsoft.com/download/f/7/8/f784a197-73be-48ff-83da-4102c05a6d44/APP-V/App-V_and_ConfigMgr_Whitepaper_Final.docx.

"International Search Report & Written Opinion for PCT Patent Application No. PCT/US2013/040015", Mailed Date: Aug. 28, 2013, Filed Date: May 8, 2013, 12 Pages.

Nishant Thorat, et al; "The Impact of Virtualization on Software Architecture;" The Architecture Journal; Jun. 2010, pp. 1-10; Journal 24; http://msdn.microsoft.com/en-us/architecture/ff803567.

Aaron Black; "Streaming Execution Mode;" Application Streaming with VMware ThinApp Information Guide; 2011; pp. 1-8; VMWare; http://www.vmware.com/files/pdf/VMware_ThinApp_Streaming_Execution_Mode_Information_Guide.pdf.

* cited by examiner

EVENT-RESPONSIVE DOWNLOAD OF PORTIONS OF STREAMED APPLICATIONS

TECHNICAL FIELD

Aspects of the disclosure are related to computing applications, and in particular, to the streaming of application programs.

TECHNICAL BACKGROUND

The streaming of application programs over networks for execution on local computing devices is a considerably complex endeavor that allows for quick enjoyment of an application without having to first fully install the application. Most streaming solutions require modifications to the operating system, such as installing a specialized driver, before a program can be streamed. Once this is accomplished, at least an initial portion of the program is downloaded before it can be launched. The specialized driver assists in the background with retrieving additional portions of the program while the initial portion runs.

In general, the smaller the initial portion is, the less time it takes to launch the program. However, as the size of the initial portion of the program is reduced, the likelihood that the initial portion may need to jump to another portion of the program that has not yet been downloaded increases.

One solution handles this challenge by monitoring for page faults caused by such jumps. A memory manager responds to a page fault by requesting the relevant page from a file system. A specialized driver coupled with a streaming engine interacts with the file system to retrieve the page from a network location. The page is then provided to the file system and, in turn, to the memory manager. The relevant page is ultimately deposited in memory and the program can continue to run until the next page fault occurs, thereby triggering a repeat of the aforementioned process.

OVERVIEW

Provided herein are systems, methods, and software for facilitating the streaming of application programs. In particular, implementations disclosed herein pertain to application programs capable of self-streaming by monitoring for events triggered by other portions of the applications requiring additional portions to be downloaded.

In one implementation, an application program includes an event handling portion that monitors for an event associated with execution of an initial portion of the application program downloaded with the event handling portion. The execution of the initial portion involves an additional portion of the application program not yet downloaded to the computing system. In response to detecting the event, the execution of the initial portion of the application program is paused by the event handler and downloading of the additional portion is initiated. Upon downloading the additional portion of the application program, execution of the initial portion of the application program can resume.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations described herein provide for improved streaming of application programs. In particular, an application program described herein includes several portions that, upon being downloaded and launched, allow for the streaming of additional portions of the application. An event handler portion contained within the application itself is capable of monitoring for events triggered by the execution of other portions of the application that might invoke, implicate, or otherwise involve another portion not yet downloaded. The event handler can then initiate action to retrieve or otherwise download that portion for introduction and execution as part of the application.

Figure 1:
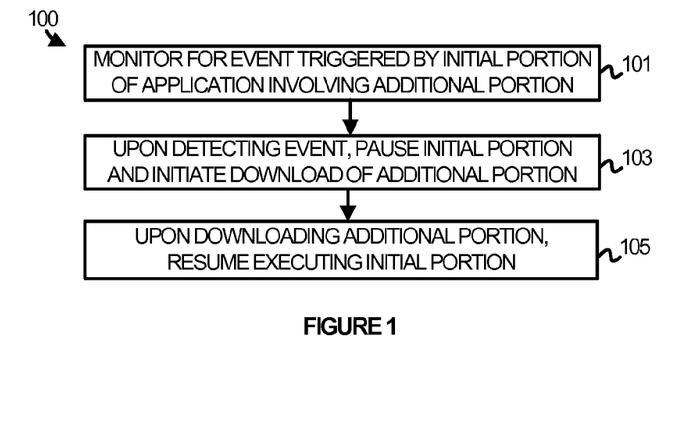
FIG. 1 illustrates an event handling process in an implementation.
Figure 2:
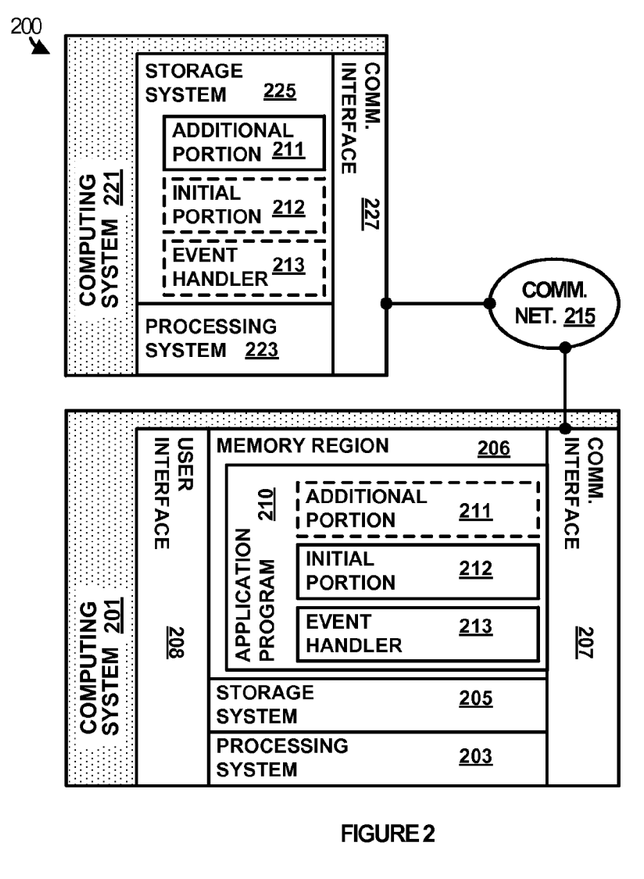
FIG. 2 illustrates a streaming environment in an implementation.
Figure 3:
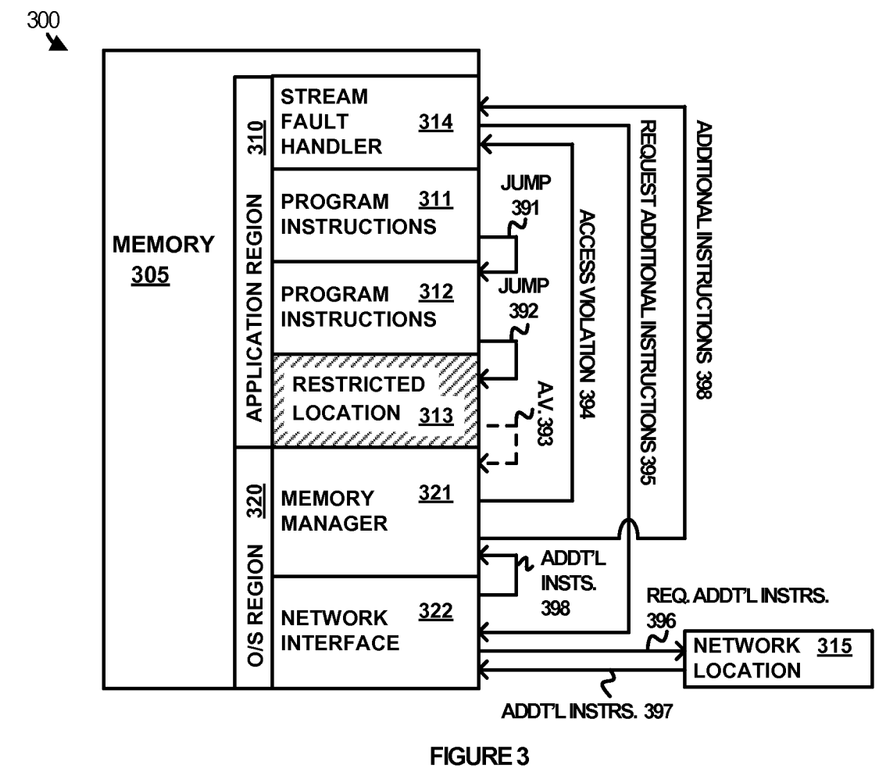
FIG. 3 illustrates a streaming environment in an implementation, as well as a method of operation.
Figure 4:
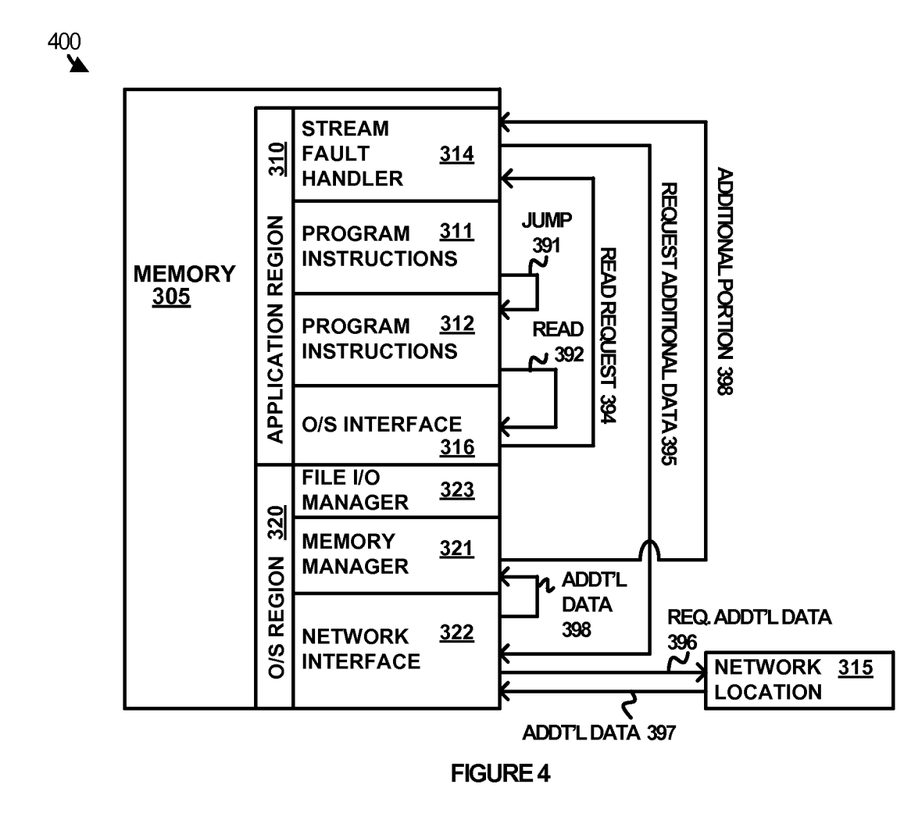
FIG. 4 illustrates a streaming environment in an implementation, as well as a method of operation.
Figure 5:
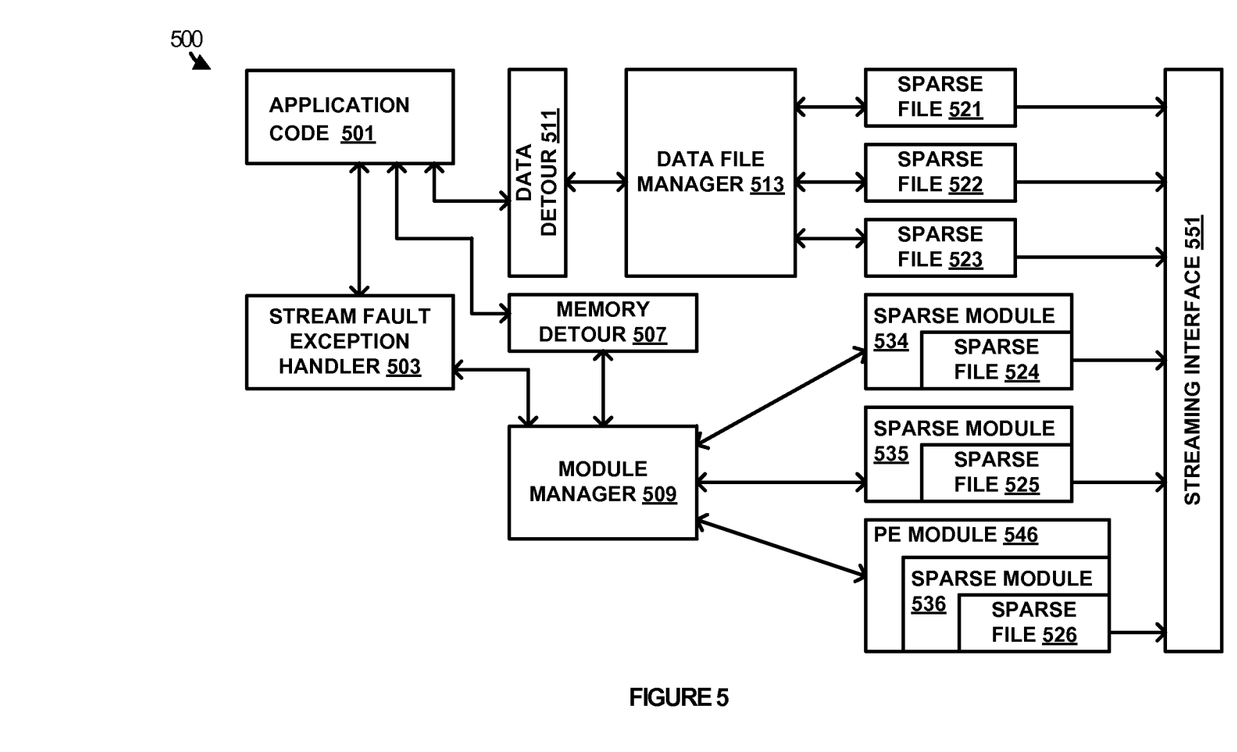
FIG. 5 illustrates a component view of an application program in an implementation.

Referring now to the drawings, FIG. 1 is provided to illustrate a method or process that is performed by elements of computing system 201 from FIG. 2 to facilitate application streaming. FIG. 2 illustrates a suitable computing environment in which to implement event handling process 100. FIG. 3 and FIG. 4 illustrate two more suitable computing environments in which to implement processes for facilitating the streaming of application programs. Finally, FIG. 5 illustrates a module or component view of one such application.

Turning now to FIG. 1, event handling process 100 illustrates the operation of an event handler portion, herein referred to as event handler 213, of application program 210 that facilitates streaming from computing system 221 to computing system 201. During the download process, computing systems 201 and 221 communicate via communication interfaces 207 and 227 respectively to stream application program 210 to computing system 201. To accomplish this, portions of application program 210 are streamed or downloaded to computing system 201 immediately, while the remaining portions are either gradually downloaded in the background or selectively downloaded in an accelerated manner per event handling process 100. In this example, initial portion 212 and event handler 213 are successfully transferred to computing system 201 and execution of them by processing system 203 can commence.

Upon being downloaded from computing system 221 to computing system 201 over communication network 215, event handler 213 monitors for events triggered by or otherwise associated with initial portion 212 that involve additional portion 211 (step 101). In this example, it is assumed that additional portion 211 is yet to be downloaded. Thus, upon detecting the event, event handler 213 pauses the execution of initial portion 212 and initiates a download of additional portion 211 from computing system 221 (step 103). Upon successfully downloading additional portion 211, event handler 213 resumes or otherwise allows for the resumption of the execution of initial portion 212 (Step 105).

It should be understood that the portion of application program 210 remaining to be downloaded from computing system 221 after initial portion 212 and event handler 213 are downloaded may include other portions in addition to additional portion 211. In other words, upon downloading initial portion 212 and event handler 213, a background download process may execute that gradually transfers any remaining portions of application program 210 to computing system 201. However, event handler 213 functions to immediately retrieve any additional portions that may be invoked or otherwise involved by the execution of initial portion 212.

Referring now to FIG. 2, streaming environment 200, in which event handling process 100 may be implemented, includes computing system 201, computing system 221, and communication network 215 over which an application program or programs can be streamed. It should be understood that more computing systems may be present in streaming environment 200. In addition, many other configurations of computing devices and software computing systems may be employed to implement event handling process 100.

Computing system 201 communicates with computing system 221 over communication network 215. Communication network 215 may be a stand-alone network, but may also include a collection of networks. Computing system 201 is intended to represent a suitable system for implementing event handling process 100, and in general, a system suitable for running applications streamed to it from network locations, such as computing system 221. Computing system 221 is intended to represent a system suitable for hosting applications that can be streamed to local devices, such as computing system 201.

Computing system 201 may be any type of computing system capable of executing an event handler to monitor for events, pause an initial portion of an application program downloaded with the event handler, and initiate a download of additional portions of the application program, as described by event handling process 100. Examples of computing system 201 include personal computers, laptop computers, tablet computers, mobile computing devices, mobile phones, and other types of devices, computers, or appliances capable of executing applications streamed from network locations. Indeed, computing system 201 may be implemented as a single computing system, but may also be implemented in a distributed manner across multiple computing systems. Computing system 201 is provided as an example of a general purpose computing system that, when implementing event handling process 100, becomes a specialized system capable of executing streamed applications.

Computing system 201 includes processing system 203, storage system 205, memory region 206, communication interface 207, and user interface 208. Processing system 203 is communicatively coupled with storage system 205, communication interface 207, and user interface 208. Storage system 205 stores software in memory region 206, such as application program 210, which when executed by processing system 203, directs computing system 201 to operate as described for event handling process 100.

In particular, upon being downloaded from computing system 221, initial portion 212 and event handler 213 are stored in a region of memory 206 allocated to application program 210 and can be executed by processing system 203. In other words, initial portion 212 and event handler 213 can be considered a part of application program 210. It should be understood that initial portion 212 and event handler 213 are not part of an operating system, although either or both may communicate with elements of an operating system.

Referring still to FIG. 2, processing system 203 may comprise a microprocessor and other circuitry that retrieves and executes application program 210, and in particular event handler 213, from memory region 206 in storage system 205. Event handler 213 includes event handling process 100. Processing system 203 may be implemented within a single processing device but may also be distributed across multiple processing devices or sub-systems that cooperate in executing program instructions. Examples of processing system 203 include general purpose central processing units, application specific processors, and logic devices, as well as any other type of processing device.

Storage system 205 may comprise any storage media readable by processing system 203 and capable of storing software in memory region 206. Memory region 206 may be a region within virtual memory, non-virtual memory, or a combination or variation of both. Storage system 205 may include volatile and nonvolatile, removable and non-removable media implemented in any method or technology for storage of information, such as computer readable instructions, data structures, program modules, or other data. Storage system 205 may be implemented as a single storage device but may also be implemented across multiple storage devices or sub-systems. Storage system 205 may comprise additional elements, such as a controller, capable of communicating with processing system 203.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Application program 210 comprises computer program instructions, such as initial portion 212, event handler 213, and additional portion 211 (upon download of it to computing system 201). Other software in addition to application program 210 may be implemented in computing system 201, such as operating system software or other application software. The other software may comprise firmware, or some other form of machine-readable processing instructions that interact with application program 210.

In general, application program 210 may, when loaded into processing system 203 and executed, transform processing system 203, and computing system 201 overall, from a general-purpose computing system into a special-purpose computing system customized to facilitate the streaming of application program 210 as described herein for event handling process 100. However, it should be understood that, while the execution of application program 210 may transform computing system 201 in a special-purpose system, other specialized components are obviated by application program 210, such as the specialized drivers discussed above with respect to the background.

Indeed, encoding application program 210 on storage system 205 as it is streamed to computing system 201 may transform the physical structure of storage system 205. The specific transformation of the physical structure may depend on various factors in different implementations of this description. Examples of such factors may include, but are not limited to: the technology used to implement the storage media of storage system 205, whether the computer-storage media are characterized as primary or secondary storage, and the like.

For example, if the computer-storage media are implemented as semiconductor-based memory, application program 210 may transform the physical state of the semiconductor memory when the program is encoded therein. For example, application program 210 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

It should be understood that, prior to downloading any portion of application program 210 to computing system 201, application program 210 resides on computing system 221. In fact, even upon being downloaded to computing system 201, the source version of application program 210 may still reside on computing system 221, available for streaming to other computing systems and devices. Thus, encoding application program 210 on storage system 225 in computing system 221 may also transform the physical structure of storage system 225. As mentioned previously, the specific transformation of the physical structure may depend on various factors in different implementations of this description.

Referring again to FIGS. 1-2, through the operation of computer system 201 employing application program 210, transformations may be performed in streaming environment 200. As an example, computing system 201 could be considered transformed from one state to another by the download of additional portion 211 of application program 210 from computing system 221, selectively triggered by the operation of event handler 213. In other words, in a first state, additional portion 211 is yet to be downloaded while event handler 213 monitors for events associated with the execution of initial portion 212. Upon detecting such an event, event handler 213 initiates the download of additional portion 211 to computing system 201, thereby changing computing system 201 to a second, different state that now includes additional portion 211 resident in memory region 206.

Communication interface 207 may include communication connections and devices that allow for communication between computing system 201 and computing system 221 over communication network 215. Examples of connections and devices that together allow for inter-system communication include network interface cards, antennas, power amplifiers, RF circuitry, transceivers, and other communication circuitry. The aforementioned network, connections, and devices are well known in the art and need not be discussed at length here.

User interface 208 may include a mouse, a voice input device, a touch input device for receiving a gesture from a user, and other comparable input devices and associated processing elements capable of receiving user input from a user. Output devices such as a display, speakers, printer, and other types of output devices may also be included.

Computing system 221 may be considered generally analogous to computing system 201 in that it includes many elements corresponding to those of computing system 201, such as processing system 223, storage system 225, and communication interface 227. Thus, a detailed discussion of the elements of computing system 221 is refrained from for purposes of clarity. Examples of computing system 221 include server computers, virtual machines, network clusters, or any combination or variation thereof, as well as any other type of device, computer, or appliance capable of streaming applications to local devices.

Turning now to FIG. 3 and FIG. 4, the facilitation of application streaming is illustrated by way of two different examples. In FIG. 3, streaming environment 300 illustrates an example whereby streaming is facilitated by the detection of access violations. In FIG. 4, streaming environment 400 illustrates monitoring read requests to facilitate application streaming. Steaming environments 300 and 400 are provided to illustrate the various software components involved in facilitating application streaming. The software components may be loaded into and executed on general purpose computing systems, such as computing systems 201 and 221 illustrated in FIG. 2. However, an illustration and discussion of the various hardware components and other supporting components is refrained from for purposes of clarity.

In FIG. 3, streaming environment 300 includes memory 305 and network location 315. Memory 305 may be implemented in any storage system similar to storage system 205 illustrated in FIG. 2. Memory 305 may be non-virtual, virtual, or any combination or variation thereof. Network location 315 is any system or collection of systems capable of streaming application programs to a computing system within which memory 305 may reside or be implemented, such as computing system 201 illustrated in FIG. 2.

In operation, an application program is requested to be streamed from network location 315 into memory 305 and executed therefrom. To accomplish this, a boot block or boot package is first downloaded from network location 315. In this illustration, the boot block includes at least sets of program instructions 311 and 312, as well as stream fault handler 314. Program instructions 311 and 312 may be part of various files downloaded as part of the boot block that enable the application program to begin execution, such as dynamic link libraries, executable files, and the like. Stream fault handler 314 may also be program instructions, but is referred to herein with greater specificity than program instructions 311 and 312 for illustrative purposes.

Typically, the boot block is desired to be as small as possible so as to allow for very rapid launching of the application program. However, the smaller the boot block, the more likely it is that the boot block lacks code or data files that must then be retrieved from network location 315. Stream fault handler 314 functions to assist with the process of identifying when to retrieve additional portions of the application program from network location 315, as well as other functions. A more detailed discussion of the elements of stream fault handler 314 follows below with respect to FIG. 5.

Upon downloading the boot block, stream fault handler 314, program instructions 311, and program instructions 312 are loaded into or otherwise mapped to a portion of memory 305 allocated to the application program, namely, application region 310. In contrast, other portions of memory 305 may be allocated to other programs. For example, operating system region 320 is allocated to memory manager 321 and network interface 322, which both may be considered part of the operating system. Application region 310 may be referred to as or considered user space within memory 305, whereas operating system region 320 may be referred to as or considered kernel space within memory 305.

Further in operation, as described by operational sequence numbers in FIG. 3, while executing, program instructions 311 may cause a jump to program instructions 312 (step 391). While program instructions 311 are executing, stream fault handler 314 monitors for attempts to access restricted location 313 within application region 310. Stream fault handler 314 may communicate with memory manager 321 to monitor for such faults. With respect to the jump from program instructions 311 to program instructions 312, no fault is incurred.

However, as illustrated in FIG. 3, program instructions 312 cause a jump to restricted location 313 (step 392). This fault is detected by elements within the operating system and reported to stream fault handler 314 by way of memory manager 321 (step 394). Access violations are different than page faults in that a page fault occurs when a particular page jumped to or requested by executing code is not loaded into or mapped within a relevant memory space. In contrast, the access violation discussed herein is caused by a jump to a portion of memory that is restricted. In other words, a page may be loaded in that space, but access restricted to it.

In fact, stream fault handler 314, program instructions 311, or program instructions 312 may configure restricted location 313 as restricted upon being downloaded and launched. Alternatively, other program elements downloaded within the boot block may perform the function of restricting access in order for later jumps to the space to trigger access violations. Restricted location 313 may be a marked page having an access bit set to indicate the access restrictions placed upon it.

Having been notified of the access violation, stream fault handler 314 proceeds to initiate a download of additional program instructions from network location. In this example, stream fault handler 314 communicates a request to network interface 322 in operating system region 320 to obtain the additional program instructions (step 395). In some cases, stream fault handler 314 may perform the function of identifying specifically which program instructions or which remaining portion to obtain from network location 315. For example, stream fault handler 314 may look-up the relevant portion that corresponds to the marked page in restricted location 313. It should be understood that stream fault handler 314 may communicate directly with network interface 322, but may also initiate the retrieval or otherwise communicate with network interface 322 by way of other intermediate elements.

Network interface 322 responsively communicates with network location 315 to request the additional instructions (step 396). The request may identify a particular module, file range, or other such identifier that allows systems or sub systems within network location 315 to identify the relevant program instructions. Network location 315 then returns the additional program instructions to network interface (step 397). In this example, the additional program instructions are provided to stream fault handler 314 (step 398) for insertion into an appropriate location within application region 310. Stream fault handler 314 can then allow the process associated with program instructions 312 that was interrupted by the access violation, to resume. This may include the execution of the additional program instructions newly downloaded and mapped into memory.

While the preceding discussion made reference to additional program instructions, it should be understood that other types of information could be retrieved from network location 315 in this manner. For example, program data may be retrieved. Examples of program data include bitmaps, tables, and the like. In other words, program instructions 312 may be associated with a process that consumes data that has not yet been downloaded. Thus, an attempt to access a memory location mapped for that data would trigger a similar access violation. The same process can be followed to identify the relevant part of any remaining portion of the program application yet to be downloaded from network location 315. The data can be retrieved, loaded into memory, and then consumed by the process.

In FIG. 4, application streaming is facilitated in a manner different than in FIG. 3. Namely, streamlining environment 400 includes file input/output (I/O) manager 323 and operating system (O/S) interface 316. File I/O manager 323 services read requests made by applications that are communicated to it by O/S interface 316. O/S interface 316 is part the program application and provides an interface for other elements, such as program instructions 311 and 312, to make calls to operating system services.

Accordingly, in the example illustrated in FIG. 4, program instructions 312 make a read request to O/S interface 316 (step 392) to obtain data from a particular file that has yet to be downloaded from network location 315. The read request would normally be communicated to O/S interface 316. However, in this implementation the read request is intercepted by stream fault handler 314 (step 394).

Having been notified of the read request, stream fault handler 314 proceeds to initiate a download of additional program instructions from network location. In this example, stream fault handler 314 communicates a request to network interface 322 in operating system region 320 to obtain the relevant data (step 395). In some cases, stream fault handler 314 may perform the function of identifying specifically which remaining portion to obtain from network location 315. It should be understood that stream fault handler 314 may communicate directly with network interface 322, but may also initiate the retrieval or otherwise communicate with network interface 322 by way of other intermediate elements.

Network interface 322 responsively communicates with network location 315 to request the additional data (step 396). The request may identify a particular module, file range, or other such identifier that allows systems or sub systems within network location 315 to identify the relevant data. Network location 315 then returns the additional data to network interface (step 397). In this example, the additional data are provided to stream fault handler 314 (step 398) for insertion into an appropriate location within application region 310. Stream fault handler 314 can then allow the process associated with program instructions 312 that was interrupted by the access violation, to resume.

While the preceding discussion made reference to additional data, such as bitmap images or tables, it should be understood that other types of information could be retrieved from network location 315 in this manner. For example, program instructions 312 may include additional code capable of reading new code from a file and managing mappings, relocations, bindings, and other functions to make code executable in memory. The additional code could thus be retrieved from a file on network location 315 in the same manner as other types of data, such as images.

In an alternative, a different type of hook could be implemented different than monitoring read requests. Rather, stream fault handler 314 could communicate with a portion of O/S interface 316 that handles open requests. In other words, anytime code executing from within application region 310 attempts to open a file that has yet to be down loaded, O/S interface 316 could communicate the event to stream fault handler 314. Stream fault handler 314 could then proceed to obtain the file, or portions of the file, from network location 315.

FIG. 5 illustrates a component view 500 of an application program in an implementation. Component view 500 includes application code 501, stream fault exception handler 503, memory detour 507, module manager 509, data detour 511, data file manager 513, sparse files 521, 522, 523, 524, 525, and 526, spares modules 534 and 535, portable execution (PE) module 546, and streaming interface 551. Stream fault exception handler 503, memory detour 507, module manager 509, data detour 511, data file manager 513, sparse files 521-526, spares modules 534 and 535, and portable execution (PE) module 546 are each components that may be found in stream fault handlers, such as stream fault handler 314 illustrated in FIGS. 3 and 4. It should be understood that streaming interface 551 may or may not be considered part of the application program.

Application code 501 comprises at least an initial portion of the program application that is downloaded as part of a boot block. The boot block includes application code 501, as well as the other elements illustrated in component view 500. As application code 501 is executed, stream fault exception handler 503 monitors for faults, such as access violations, read requests, and file open requests, that may trigger downloading of additional portions of the application program.

Stream fault exception handler 503 is the first chance exception filter which provides the core of an exception based user mode streaming model. Stream fault exception handler 503 may be invoked anytime an exception occurs. Stream fault exception handler 503 communicates with data detour 511 and memory detour 507 to learn of access violations, read requests, file open requests, and other suitable faults that may trigger downloading of additional portions of the program application.

Module manager 509 is responsible for handling memory stream faults. For example, a memory stream fault may be an access to a virtual memory that is inside the memory mapped region of a sparse file. One way for the stream fault exception handler to be invoked on a memory stream fault is to mark the corresponding virtual memory page with a PAGE_NOACCESS bit. This will cause a memory stream fault to trigger an access violation exception which will invoke stream fault exception handler 503. Module manager 509 maintains an internal list of memory mapped files. Each memory mapped file is tracked by a corresponding PE module 546 or sparse module 534, 535. The handling of a memory stream fault is done by identifying which module object covers the memory region and then control is passed to the corresponding PE module 546 or sparse module 534, 535.

PE module 546 is representative of a PEModule class that extends the SparseModule class, which is discussed in more detail below. PE module 546 handles memory stream faults for any PE format sparse files, such as dynamic linked library files or executable files. This wrapper class is responsible for handling a memory stream fault inside of a PE module. When such a fault occurs, PE module 546 translates the virtual memory address associated with the fault to a file range request. This translation will ensure cross-page/cross-section accesses. Next, the base class (SparseModule) is requested to provide the data. Ultimately, raw file data ranges are translated back into virtual ranges. The contiguous range of data in a file might not be contiguous in virtual memory. Any other remaining relocation adjustments on raw data are performed. Then, the base class (SparseModule) is called to move the fixed-up buffer to a final destination in virtual memory.

Sparse modules 534, 535 are representative of a SparseModule class and handle memory stream faults for any sparse files 521-526 that are memory mapped with the exception of PE files. A memory stream fault inside a memory map is handled by translating the virtual memory address to file range request, requesting the base class (sparse file) to provide the data, and copying the data to a corresponding virtual memory region. In some cases, the region of virtual memory is first opened to write before the buffer can be copied in.

Sparse files 521-526 are representative of a SparseFile class that handles requests for file ranges from within an executing process. These requests can come from the SparseModule, PEModule or ModuleManager classes described above or directly from data file manager 513. This class is a wrapper around streaming interface 551 which provides access to a streaming engine (not shown). The streaming engine performs actual downloads, staging and on disk file management.

Data file manager 513 is responsible for handling data stream faults. Unlike module manager 509, data file manager 513 does not have to be initialized. Rather, it can directly hook access to data files through data detours 511.

The following is a brief discussion of a memory stream fault and the flow through component view 500 when handling such faults. First, application code 501 attempts to access a marked page within virtual memory, which causes an access violation. Stream fault exception handler 503 captures the violation and calls module manager 509 with the virtual memory address where the access violation occurred. Module manager 509 finds the Sparse Module or PE Module which contains the address, which in this case is assumed to be sparse module 534 for illustrative purposes. Module manager 509 then passes the request on to sparse module 534.

Spares module 534 then identifies the virtual page that contains the virtual memory address. Sparse module 534 converts the virtual page to a file range and requests that sparse file 523 obtain the data. Sparse file 523 passes the file range request onto streaming interface 551. Streaming interface 551 returns with a buffer containing the data for the requested range. This buffer is passed on to sparse module 534, which copies this data to the corresponding virtual page. Control is then returned back up the chain and the process that was interrupted can continue.

The following discussion relates to the flow through component view 500 in the event of a data stream fault. Application code 501 attempts to read data from a file. Data detours 511 captures the call and calls data file manager 513. Data file manager finds the corresponding Sparse File object in its current list (or creates one as necessary), which in this case is assumed to be sparse file 521. The request is passed to sparse file 521. Sparse file 521 passes the file range request to streaming interface 551, which returns with a buffer containing the data for the requested range. This buffer is passed to data manager 513, which passes it to data detours 511. Data detours 511 returns the buffer to application code 501 for consumption.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
   one or more computer readable storage devices;
   a computing system operatively coupled with the one or more computer readable storage devices; and
   program instructions stored on the one or more computer readable storage devices and comprising at least an event handling portion of an application program for facilitating streaming of the application program that, when executed by the computing system directs the computing system to at least:
   monitor for an event associated with execution of an initial portion of the application program downloaded with the event handling portion, wherein the event comprises an access violation triggered by an execution jump to a portion of memory that is restricted and that involves an additional portion of the application program not yet downloaded to the computing system;
   in response to detecting the access violation, pause the execution of the initial portion of the application program and initiate downloading of the additional portion of the application program to the computing system; and
   upon downloading the additional portion of the application program to the computing system, resume the execution of the initial portion of the application program that involves the additional portion of the application program;
   wherein the access violation corresponds to an access restricted page within a range of virtual memory allocated to the application program, wherein the access restricted page comprises a page loaded into the range of virtual memory but not accessible by the initial portion of the application, wherein the access violation is not a page fault, and wherein to monitor for the event, the event handling portion of the application program directs the computing system to at least: receive a notification of the access violation from an operating system element that the access violation occurred.

2. The apparatus of claim 1 wherein the event handler portion of the application program, when executed by the computing system, further directs the computing system to identify the additional portion from remaining portions of the application program yet to be downloaded corresponding to the access restricted page.

3. The apparatus of claim 1 wherein the additional portion of the application program comprises executable code.

4. The apparatus of claim 1 wherein the additional portion of the application program comprises non-executable data to be processed by the initial portion of the application program.

5. The apparatus of claim 1 wherein the access violation comprises an attempt to read data from the additional portion of the application program.

6. The apparatus of claim 1, with the one or more computer readable storage devices having stored thereon the initial portion of the application program that, when executed by the computing system, directs the computing system to map the event handler portion and the initial portion of the application program within a range of the memory allocated to the application program.

7. The apparatus of claim 6 wherein the initial portion of the application program, when executed by the computing system, directs the computing system to map the additional portion of the application program within the range of the memory allocated to the application program, wherein the memory comprises virtual memory.

8. A method for facilitating streaming of an application program comprising an event handling portion, an initial portion, and an additional portion, the method comprising:
   downloading a boot block from a network location to a computing system, wherein the boot block includes the event handling portion and the initial portion of the application program; and
   during execution of the application program, detecting an event comprising an access violation triggered by an execution jump to a portion of memory that is restricted and is associated with execution of the initial portion involving the additional portion;
   responsive to detecting the event, downloading the additional portion from the network location to the computing system;
   wherein the access violation corresponds to an access restricted page within a range of virtual memory allocated to the application program, wherein the access restricted page comprises a page loaded into the range of virtual memory but not accessible by the initial portion of the application, wherein the access violation is not a page fault, and wherein to monitor for the event, the event handling portion of the application program directs the computing system to at least: receive a notification of the access violation from an operating system element that the access violation occurred.

9. The method of claim 8 further comprising:
   monitoring for the access violation associated with the execution of the initial portion that involves the additional portion of the application program;
   in response to detecting the access violation, pausing the execution of the initial portion of the application program and initiating the downloading of the additional portion of the application program to the computing system; and
   upon downloading the additional portion of the application program to the computing system, resuming the execution of the initial portion of the application program that involves the additional portion of the application program.

10. The method of claim 9 wherein the access violation corresponds to an access restricted page within a range of the memory allocated to the application program.

11. The method of claim 9 further comprising identifying the additional portion from a remainder of the application program yet to be downloaded that corresponds to the access restricted page.

12. The method of claim 9 wherein the additional portion of the application program comprises at least one of executable code and non-executable data to be processed by the initial portion of the application program.

13. The method of claim 9 wherein the access violation associated with the execution of the initial portion of the application program comprises an attempt to read data from the additional portion of the application program.

14. The method of claim 8 further comprising mapping the event handler portion and the initial portion of the application program within a range of virtual memory allocated to the application program and mapping the additional portion of the application program within the range of virtual memory allocated to the application program.

15. One or more computer readable storage devices having stored thereon at least an event handling portion of an application program for facilitating streaming of the application program that when executed by a computing system directs the computing system to at least:
  during execution of the initial portion of the application downloaded with the event handling portion, monitor for an access violation triggered by an execution jump to a portion of memory that is restricted and that involves a first additional portion of the application program not yet downloaded to the computing system;
  in response to detecting the access violation, pause the execution of the initial portion of the application program and initiate a download of the first additional portion of the application program to the computing system; and
  upon downloading the first additional portion of the application program to the computing system, resume the execution of the initial portion of the application program;
  wherein the access violation corresponds to an access restricted page within a range of virtual memory allocated to the application program, wherein the access restricted page comprises a page loaded into the range of virtual memory but not accessible by the initial portion of the application, wherein the access violation is not a page fault, and wherein to monitor for the event, the event handling portion of the application program directs the computing system to at least: receive a notification of the access violation from an operating system element that the access violation occurred.

16. The one or more computer readable storage devices of claim 15 wherein the event handler instructions, when executed by the computing system, further direct the computing system to:
  monitor for an attempt to read data from a second additional portion of the application program yet to be downloaded;
  in response to detecting the attempt to read the data from the second additional portion of the application program, pause the execution of the initial portion of the application program and initiate a download of the second additional portion of the application program to the computing system; and
  upon downloading the second additional portion of the application program to the computing system, resume the execution of the initial portion of the application program.

17. The one or more computer readable storage devices of claim 16 wherein the event handler portion of the application program, when executed by the computing system, further directs the computing system to identify the additional portion from remaining portions of the application program yet to be downloaded that corresponds to an access restricted page.

18. The one or more computer readable storage devices of claim 16 wherein the first additional portion of the application program comprises executable code and wherein the second additional portion of the application program comprises non-executable data to be processed by the initial portion of the application program.

19. The one or more computer readable storage devices of claim 15 having stored thereon the initial portion of the application program that, when executed by the computing system, directs the computing system to map the event handler portion, the initial portion, and the additional portion of the application program within a range of the memory allocated to the application program.

* * * * *